April 14, 1925.
H. F. RICHARDSON ET AL
JUNCTION BOX
Filed July 12, 1924
1,533,759
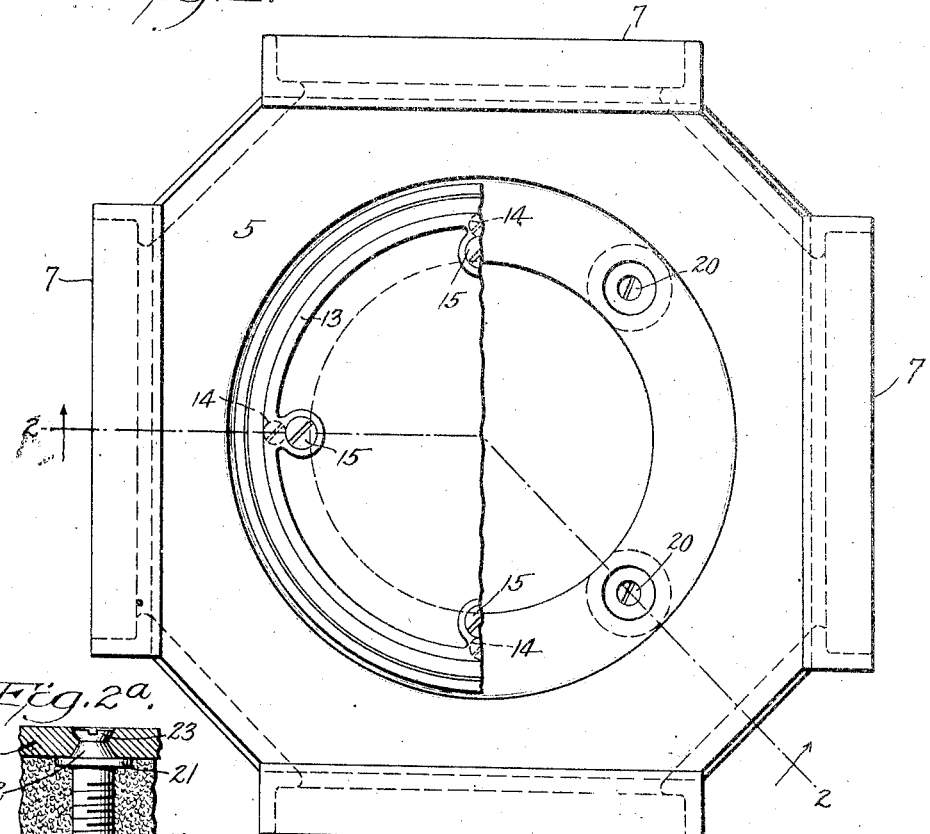
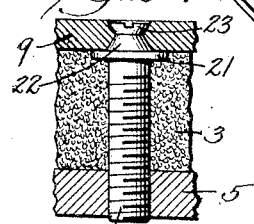
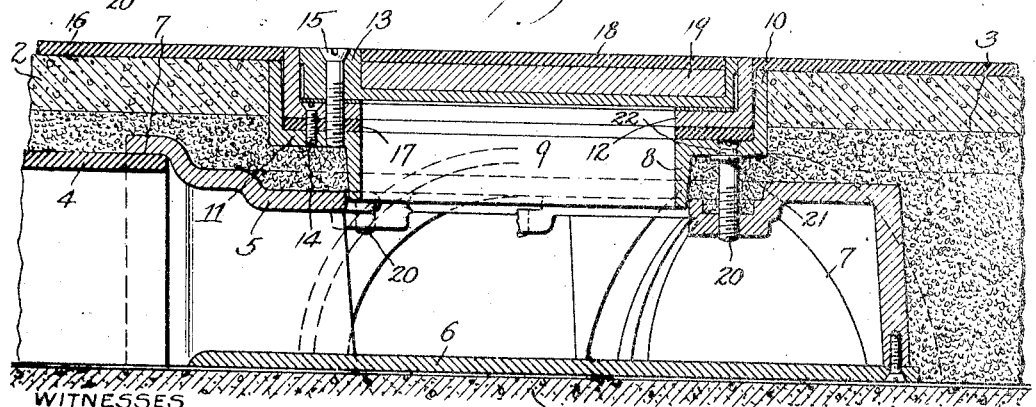
WITNESSES
INVENTOR
Henry F. Richardson and
Allan Coggeshall
BY
Knight Bros.
ATTORNEYS Patented Apr. 14, 1925.

1,533,759

UNITED STATES PATENT OFFICE.

HENRY F. RICHARDSON, OF BROOKLYN, AND ALLAN COGGESHALL, OF PLEASANTVILLE, NEW YORK, ASSIGNORS OF ONE-FOURTH TO HENRY F. RICHARDSON, OF BROOKLYN, NEW YORK; ONE-FOURTH TO ALLAN COGGESHALL, OF PLEASANTVILLE, NEW YORK; ONE-SIXTH TO S. R. BRADLEY, OF NYACK, NEW YORK; ONE-SIXTH TO A. M. CREGIER AND ONE-SIXTH TO ALONZO B. BRADLEY, BOTH OF ORANGEBURG, NEW YORK.

JUNCTION BOX.

Application filed July 12, 1924. Serial No. 725,667.

*To all whom it may concern:*

Be it known that we, HENRY F. RICHARDSON and ALLAN COGGESHALL, citizens of the United States, and residents, respectively, of the borough of Brooklyn, city of New York, Kings County, and State of New York, and Pleasantville, Westchester County, State of New York, have invented certain new and useful Improvements in Junction Boxes, of which the following is a specification.

Our invention relates to a system of interior electric wire conduits where, for example, the conduits are laid broadcast under the floor, with junction boxes at their intersections and service fittings inserted subsequent to the laying of the floor at such places as may from time to time be indicated. Such conduits are, in general, laid on suitable supports during the construction of the floor as, for example, on a sub-base of the floor, and then covered with a surface floor. Over the floor thus formed it is often desired to lay a floor covering of linoleum, rubber tile, wood or the like.

The problem of making a junction box or floor outlet box for the conduit and lining it up neatly with the surface of the floor is then confronted.

In the accompanying drawings:—

Figure 1 is a plan view of a junction box.

Figure 2 is a section of the junction box taken on line 2—2 of Figure 1.

Figure 2ª is a detail on a larger scale of the adjusting screw shown in Figure 2.

Referring to Figures 1 and 2, 1 represents a foundation floor which may, for example, be the usual concrete slab that extends between columns and forms the main floor of the building. Such main floor slabs form part of the main construction of the building and upon them it is customary to lay a superficial floor and it is also a general practice to lay this superficial floor upon an intermediate filling of cinders or the like. The superficial floor is shown at 2 and the cinder filling at 3. Previous to laying the superficial floor and filling, our practice is to lay upon the said floor or slab a system of electric wire conduits extending grid-iron like over all the floor surface so that all parts of the floor will be within a minimum distance of some branch of the conduit. Such conduits we prefer to make of the shape shown in Figures 3, 4 and 5, at 4, namely, of a semicircular cross-section with the open side down so as to form an arch-like conduit well adapted for withstanding the strains brought to bear upon it by loading of the floor and at the same time not to encroach too much upon the small available height. At intersections a junction box, such as shown in Figures 1 and 2, may be used. This junction box consists of a body portion 5, which may or may not have a bottom 6. The junction box is provided with suitable openings 7 flanged to lap over the ends of the conduits entering therein. The junction box has a hole, preferably circular, in its upper part, and into this hole extends the lip 8 of a curbing 9. This curbing has another flange 10 which extends up to the top of the surface floor and the flange 10 and lip 8 are connected by a horizontal shelf portion 11 adapted to form a seat for a supplemental or inner rim 12. In the supplemental or inner rim 12, a cover 13 is accurately fitted. The supplemental or inner rim 12 may be secured to the curb 9, for example, by screws 14, and the cover 13 may be secured to the curb 9 or to the supplemental rim 12 by screws 15. It is sometimes desired to lay over the concrete floor surface a covering of linoleum, rubber tile, wood or the like 16. To make everything flush with the floor, it is only necessary in such case to interpose a washer 17 between the curb and the supplemental rim of the same material, that is if the floor covering is, for example, linoleum; a washer or gasket of the same linoleum is placed between the curb and the supplemental rim and the supplemental rim will thereby be brought up to such a height that its upper edge will be exactly flush with the floor covering, preventing the latter from having its edge abraded. Also, a piece of the same floor covering 18 may be inserted in the cover 13, a suitable filling 19 being used to bring it up flush with the floor surface. To insure that all these edges will come flush with the respective levels, it is necessary to provide an adjustment for the curb 9 and this we accomplish by means of adjusting screws 20, shown in detail in Figure 2ª. These adjusting screws are screwed into the body 5 of the fitting and at their upper ends have a supporting collar 21, upon which the curb 9 rests. A conical extension 22 on the upper end of the screw serves to center the curb in position and the screws are prevented from becoming separated from the curb by having the upper end expanded as at 23 so that while the screw can be turned freely in the curb, it cannot be removed. With the aid of these screws the curb may be adjusted to any elevation and also leveled, there being three of them provided for this purpose, as shown in Figure 1. The curb 9 has the important function of providing a flush edge or curb that the mason can without difficulty sweep over with his leveler in laying the finished surface.

The provision of an inner or supplemental rim within the curb that holds the edge of the concrete floor which supplemental rim may either remain flush with the outer rim or curb or be made to project above it to the exact height necessary to bring it flush with a subsequently applied floor covering, obviates the troublesome difficulty heretofore experienced by the masons of having to level around a curb or fitting that has to be left projecting a small distance above the original floor so as to form a flush edge of a surface floor covering planned to be laid subsequently. On the other hand if to eliminate the above objection the fitting is set with its curb flush with the cement floor then when the floor covering is finally laid the cover of the fitting has to be raised by blocking up in some way until it is flush with the floor covering. This leaves no curb protecting the edge of the floor covering.

With the system of double curbs described herein, one fixed for the masons to work to, and one movable to adjust to any height required, no trouble is met from the masons' standpoint, and no consideration need be had as to the thickness of the floor covering and again if changes in floor covering should subsequently be made requiring a greater or lesser height the necessary adjustment may be easily made.

We claim:—

1. An outlet box comprising a main portion, an outer curb with a substantially horizontal shoulder between its ends, an inner curb mounted on and fitting within said outer curb, means to fasten said inner curb so that it rests directly on the shoulder or is spaced therefrom a distance to bring its upper end to a desired position above the upper end of the inner curb, and a cover fitting within said inner curb and flush with the top thereof.

2. An outlet box comprising a main portion, an outer curb with a substantially horizontal shoulder between its ends, an inner curb mounted on and fitting within said outer curb, and means to fasten said inner curb so that it rests directly on the shoulder or is spaced therefrom a distance to bring its upper end to a desired position above the upper end of the inner curb, the outside height of the inner curb being equal to the inside height of the outer curb.

3. An outlet box comprising a main portion, an outer curb with a substantially horizontal shoulder between its ends, an inner curb mounted on and fitting within said outer curb, means to fasten said inner curb so that it rests directly on the shoulder or is spaced therefrom a distance to bring its upper end to a desired position above the upper end of the inner curb, and means for adjusting the outer curb vertically on the main portion.

HENRY F. RICHARDSON.
ALLAN COGGESHALL.